US012783771B2

(12) United States Patent
Voogel

(10) Patent No.: US 12,783,771 B2
(45) Date of Patent: Nov. 3, 2026

(54) ALIGNING MULTI-CHIP DEVICES

(71) Applicant: XILINX, INC., San Jose, CA (US)

(72) Inventor: Martin L. Voogel, Niwot, CO (US)

(73) Assignee: XILINX, INC., San Jose, CA (US)

( * ) Notice: Subject to any disclaimer, the term of this patent is extended or adjusted under 35 U.S.C. 154(b) by 734 days.

(21) Appl. No.: 18/134,497

(22) Filed: Apr. 13, 2023

(65) Prior Publication Data

US 2024/0346220 A1 Oct. 17, 2024

(51) Int. Cl.

*G06F 30/347* (2020.01)
*G06F 30/394* (2020.01)
*H10W 70/60* (2026.01)
*G06F 115/02* (2020.01)

(52) U.S. Cl.

CPC .......... *G06F 30/347* (2020.01); *G06F 30/394* (2020.01); *H10W 70/611* (2026.01); *G06F 2115/02* (2020.01)

(58) Field of Classification Search

None
See application file for complete search history.

(56) References Cited

U.S. PATENT DOCUMENTS 10,515,939 B2 * 12/2019 Chen ..................... H10W 90/00
11,411,560 B1 * 8/2022 Yu .................. H03K 19/017509
2005/0194672 A1 * 9/2005 Gibson .................. H05K 1/112 257/686
2016/0240497 A1 8/2016 Chen et al.
2020/0402937 A1 * 12/2020 Sankman .............. H10W 72/90
2021/0111113 A1 4/2021 Martorell et al.
2022/0284163 A1 * 9/2022 Kolor .................... G06F 30/392
2023/0058989 A1 * 2/2023 Hammarlund ...... G06F 12/0831

OTHER PUBLICATIONS

M. Ahmed et al., "Bunch of Wires Interface PHY Design for Multi-Chiplet Systems, " 2021 IEEE 23rd Electronics Packaging Technology Conference (EPTC), pp. 395-398. (Year: 2021).*
International Search Report and Written Opinion for PCT/US2024/017907 dated May 24, 2024.

* cited by examiner

*Primary Examiner* — Leigh M Garbowski
(74) *Attorney, Agent, or Firm* — Patterson + Sheridan, LLP

(57) ABSTRACT

Embodiments herein describe arranging TX and RX circuitry in ICs such that rotated and mirrored ICs are aligned when connected in a multiple-chip device. In one embodiment, the TX circuitry (e.g., TX physical layer or PHY) is arranged in one row while the RX circuitry (e.g., RX physical layer or PHY) is arranged in another row. As such, when an IC is rotated or mirrored, at least one TX PHY is aligned with a RX PHY on the other IC. As such, non-crossing chip-to-chip connections can be formed through the interposer.

19 Claims, 6 Drawing Sheets

ALIGNING MULTI-CHIP DEVICES

TECHNICAL FIELD

Examples of the present disclosure generally relate to aligning transmit (TX) and receive (RX) circuits between integrated circuits (ICs) in a multi-chip devices.

BACKGROUND

Many devices include multiple ICs (or dies or chips) that are interconnected on a substrate or interposer. That is, chip-to-chip connections can be used to form devices that are 1×2, 1×3, 1×4, etc. Typically, each of the ICs is a different tapeout (e.g., a different set of masks is used for each IC in the multiple chip device). One reason for doing so is so that the RX and TX circuits for the chip-to-connections align. That is, the chip-to-connections do not cross when navigating through the interposer. Thus, even though the ICs may have essentially the same hardware components (e.g., hardware modules), different tapeouts and mask sets are used, which is costly.

SUMMARY

One embodiment herein is a device that includes an interposer, a first IC disposed on the interposer where the first IC includes a first row of transmit physical layers (TX PHYs) parallel to a periphery of the first IC and a second row of receive physical layers (RX PHYs) parallel to the periphery of the first IC, and a second IC disposed on the interposer where the second IC includes a third row of TX PHYs parallel to a periphery of the second IC and a fourth row of RX PHYs parallel to the periphery of the second IC. The device also includes chip-to-chip connections, in the interposer, coupling respective ones of the RX PHYs in the first IC to the TX PHYs in the second IC and respective ones of the RX PHYs in the second IC to the TX PHYs in the first IC.

Another embodiment herein is a method that includes transmitting data from a first IC to a second IC using chip-to-chip connections in an interposer where the first and second ICs are disposed on the interposer and receiving the data at the second IC. The first IC includes a first row of transmit physical layers (TX PHYs) parallel to a periphery of the first IC and a second row of receive physical layers (RX PHYs) parallel to the periphery of the first IC and the second IC includes a third row of TX PHYs parallel to a periphery of the second IC and a fourth row of RX PHYs parallel to the periphery of the second IC. Moreover, the chip-to-chip connections couple respective ones of the RX PHYs in the first IC to the TX PHYs in the second IC and respective ones of the RX PHYs in the second IC to the TX PHYs in the first IC.

Another embodiment herein is a device that includes an interposer, a first FPGA disposed on the interposer where the first FPGA includes a first circuit design, and a second FPGA disposed on the interposer where the second FPGA includes a second circuit design that is a mirror of the first circuit design. Moreover, the interposer provides connections between the first and second FPGAs.

Another embodiment herein is a device that includes an interposer, a first FPGA disposed on the interposer where the first FPGA includes a first circuit design, and a second FPGA disposed on the interposer where the second FPGA includes the first circuit design and is rotated relative to the first FPGA. Moreover, the interposer provides connections between the first and second FPGAs.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
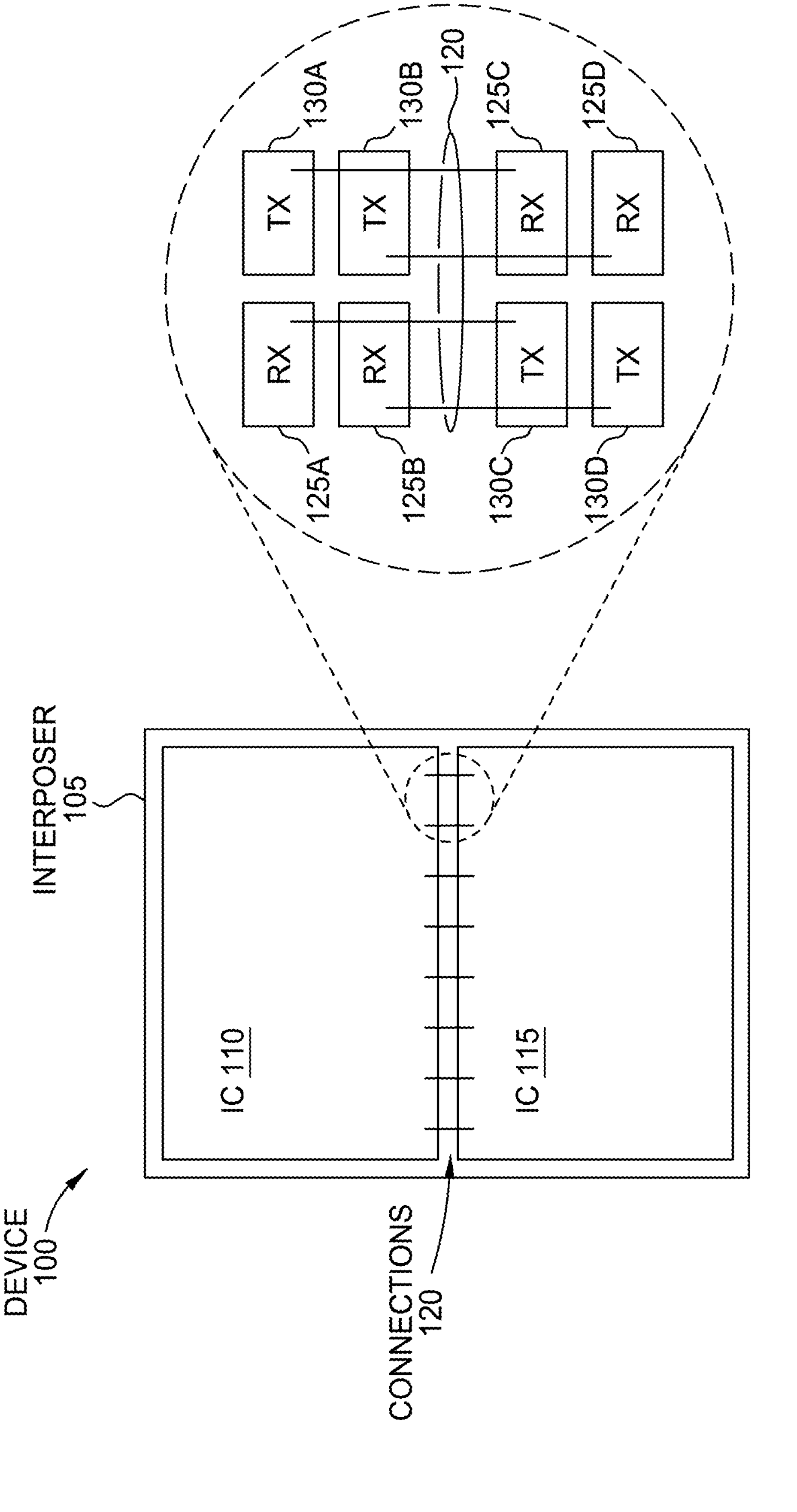
FIG. 1 (PRIOR ART)
FIG. 1 illustrates chip-to-chip connections for a device with different ICs, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe arranging TX and RX circuitry in ICs such that rotated and mirrored ICs are aligned when connected in a multiple-chip device. In one embodiment, the TX circuitry (e.g., TX physical layer or PHY) is arranged in one row while the RX circuitry (e.g., RX physical layer or PHY) is arranged in another row. As such, when an IC is rotated or mirrored, at least one TX PHY is aligned with a RX PHY on the other IC. As such, non-crossing chip-to-chip connections can be formed through the interposer. For rotated ICs, the TX and RX PHYs are aligned, but the bits may have to be out of reorder. Software or hardware may reorder the bits before data received from an IC is processed in the receiving IC.

FIG. 1 illustrates chip-to-chip connections 120 for a device 100 with different ICs, according to an example. In this example, the device 100 includes an interposer 105 on which two ICs (i.e., IC 110 and IC 115) are disposed. The interposer 105 provides the chip-to-chip connections 120 between the ICs 110, 115. For example, the interposer 105 can be a silicon interposer that includes one or more layers that include traces for forming the connections 120. In one embodiment, the ICs 110, 115 may be mounted onto the interposer 105 using, e.g., copper pillars, which then electrically couple the ICs 110, 115 to the connections 120 that route electrical signals from one IC to another IC.

In this embodiment, the ICs 110 and 115 are formed from different tapeouts (e.g., different mask sets). The ICs 110 and 115 may be application specific integrated circuits (ASICs), field programmable gate arrays (FPGA), systems of chip (SoC), and the like. In one embodiment, the ICs 110 and 115 may have the same or very similar functions, hardware modules, or hardware blocks. However, a different tapeout may be used to form the two ICs 110, 115 so that they have RX and TX circuitry that align when disposed side-by-side on the interposer 105.

The alignment between RX PHYs 125 and TX PHYs 130 are shown in more detail in the blowout in FIG. 1. In this example, the RX PHYs 125A and 125B and the TX PHYs 130A and 130B are in the IC 110 while the RX PHYs 125C and 125D and the TX PHYs 130C and 130C are in the IC 115. The chip-to-chip connections 120 through the interposer 105 connect the RX PHYs 125A and 125B in the IC 110 to corresponding TX PHYS 130C and 130C in the IC 115 and connect the RX PHYs 125C and 125D in the IC 115 to corresponding TX PHYs 130A and 130C in the IC 110. As shown, the connections 120 are non-crossing in the interposer 105. If the connections 120 were to cross, this means the connections 120 would have to be routed using multiple layers (e.g., one of the crossing connections has to be routed on a different layer in the interposer 105). However, there are typically very few layers in an interposer (e.g., three layers) which means there is limited options for routing crossing chip-to-chip connections in the interposer 105. If multiple tapeouts are used to create ICs 110 and 115, then the TX and RX circuitry can be aligned as shown, even though having multiple tapeouts adds substantial fabrication costs.

Preferably, if the ICs 110 and 115 have substantially the same hardware modules, it would save costs to use a single tapeout for both of the ICs 110 and 115 and still have the TX and RX circuitry align. This will be discussed in FIGS. 4 and 5.

Figure 2:
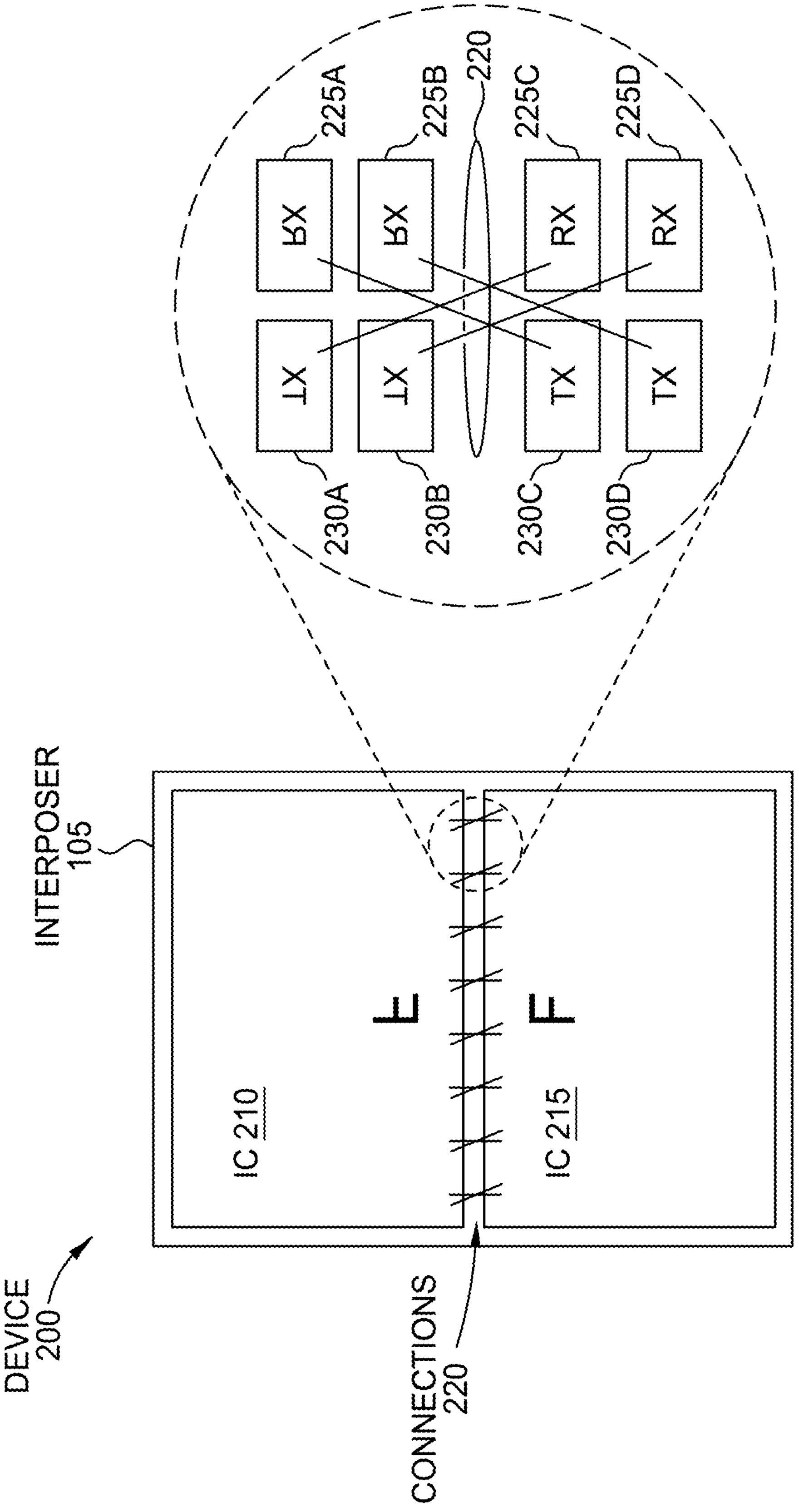
FIG. 2 (PRIOR ART)
FIG. 2 illustrates chip-to-chip connections for a device with mirrored ICs, according to an example.

FIG. 2 illustrates chip-to-chip connections 220 for a device 200 with mirrored ICs, according to an example. That is, the device 200 includes the interposer 105 on which the ICs 210 and 215 are disposed. In this example, the IC 210 is a mirror of the IC 215. Stated differently, the circuit layout of the IC 215 is mirrored relative to the circuit layout of the IC 210. This is illustrated by the "F" character where the F for the IC 210 is a mirror of the F in the IC 215.

To create mirrored circuit layouts for two ICs, after designing one of the ICs, a chip designer can instruct the software design application to mirror the design to generate a mirrored circuitry layout for the other IC. This may be a much easier design process than designing two different ICs designs, like the ICs 110 and 115 in FIG. 1. However, the blowout in FIG. 2 illustrates that mirroring the circuit layouts causes the TX and RX circuitry in the ICs 210 and 215 to misalign.

In this example, the RX PHYs 225A and 225B and the TX PHYs 230A and 230B are in the IC 210 while the RX PHYs 225C and 225D and the TX PHYs 230C and 230C are in the IC 215. Further, FIG. 2 illustrates mirrored text "TX" and "RX" for the TX PHYs 230A and 230B and the RX PHYs 225A and 225B relative to the TX PHYs 230C and 230D and the RX PHYs 225C and 225D in the IC 215. This further illustrates the mirrored chip layouts of the IC 210 and IC 215.

The chip-to-chip connections 220 through the interposer 105 connect the RX PHYs 225A and 225B in the IC 210 to corresponding TX PHYs 230C and 230C in the IC 215 and connect the RX PHYs 225C and 225D in the IC 215 to corresponding TX PHYs 230A and 230C in the IC 210. As shown, the connections 220 cross in the interposer 105. This means the connections 220 have to be routed using multiple layers in the interposer 105. However, as discussed above, there are typically very few layers in an interposer 105 which means there is limited options for routing crossing chip-to-chip connections in the interposer 105. As such, it may be impossible to connect mirrored ICs 210 and 215 using the interposer 105 due to limited routing space in the interposer 105 (or a more expensive interposer with more layers has to be used).

Figure 3:
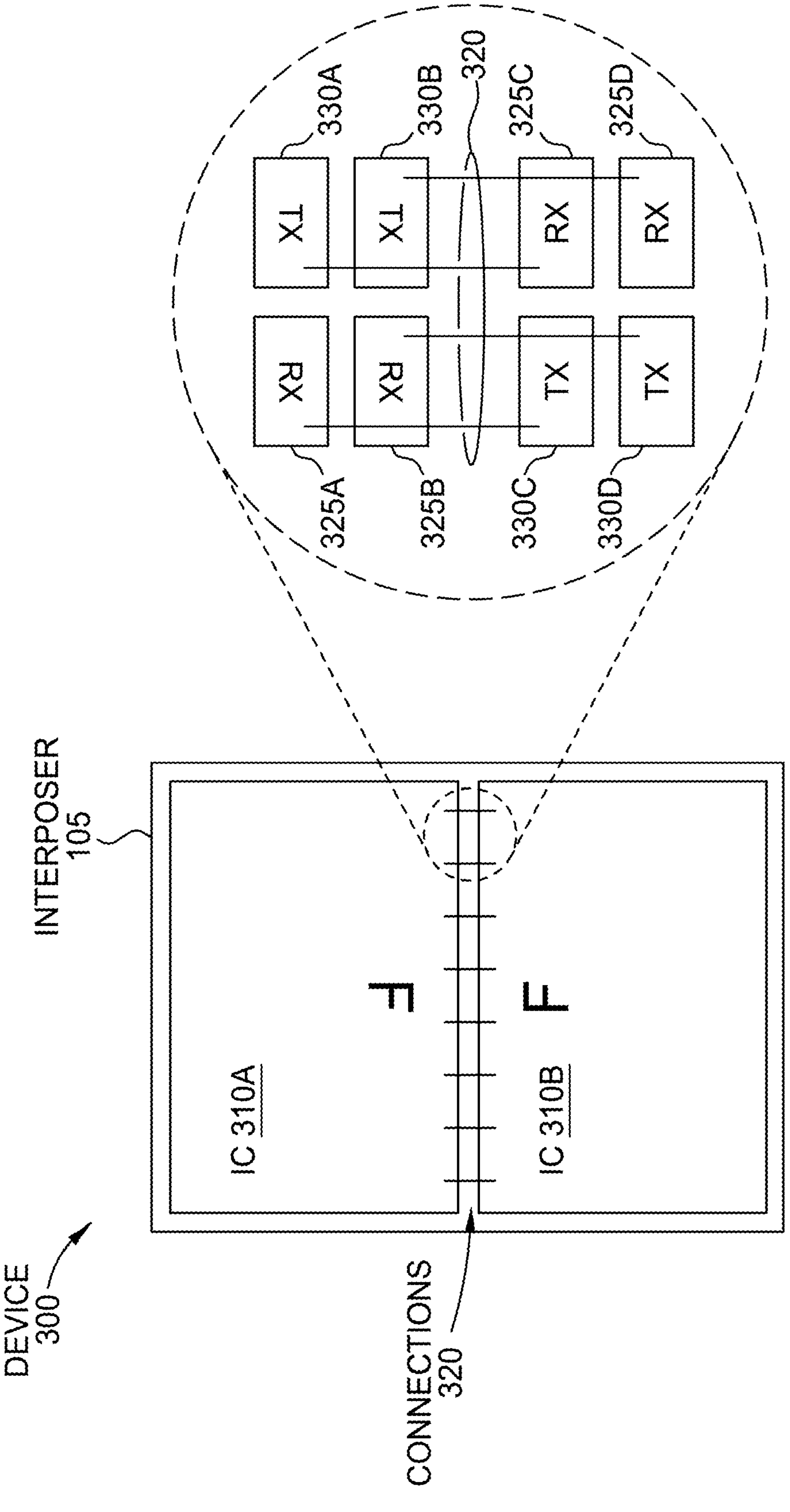
FIG. 3 (PRIOR ART)
FIG. 3 illustrates chip-to-chip connections for a device with rotated ICs, according to an example.

FIG. 3 illustrates chip-to-chip connections for a device 300 with rotated ICs, according to an example. That is, the device 300 includes the interposer 105 on which the ICs 310A and 30B are disposed. In this example, the IC 310A has the same circuitry layout or circuitry design of the IC 310B, but has been rotated 180 degrees when disposed on the interposer 105. Stated differently, the ICs 310 may be formed using the same tapeout or same set of masks. As such, the ICs 310 may be the exact same, but one chip is rotated 180 degrees relative to the other. This is illustrated by the "F" character where the F for the IC 310A is rotated 180 degrees relative to the F in the IC 310B.

The blowout in FIG. 3 illustrates that using the same ICs, which are rotated, means that the TX and RX circuitry in the ICs 310A and 310B are aligned. In this example, the RX PHYs 325A and 325B and the TX PHYs 330A and 330B are in the IC 310A while the RX PHYs 325C and 325D and the TX PHYs 330C and 330C are in the IC 310B. Further, FIG. 3 illustrates rotated text "TX" and "RX" for the TX PHYs 230A and 230B and the RX PHYs 225A and 225B relative to the TX PHYs 230C and 230D and the RX PHYs 225C and 225D in the IC 310B. That is, the text "TX" and "RX" has been rotated 180 degrees in the IC 310A relative to this text in IC 310B.

The chip-to-chip connections 320 through the interposer 105 connect the RX PHYs 325A and 3258 in the IC 310A to corresponding TX PHYs 330C and 330C in the IC 310B and connect the RX PHYs 325C and 325D in the IC 310B to corresponding TX PHYs 330A and 330C in the IC 310A. As shown, the connections 320 are non-crossing in the interposer 105, which provides the advantages discussed above. This means the connections 220 do not have to be routed using multiple layers in the interposer 105. Thus, this arrangement of the RX PHYs 325 and the TX PHYs 330 provides for aligned circuitry when using the same, but rotated ICs. But the embodiments described in FIGS. 4 and 5 provide a different arrangement that provides aligned TX and RX circuitry for both mirror ICs (e.g., FIG. 2) and rotated ICs (e.g., FIG. 3).

Figure 4:
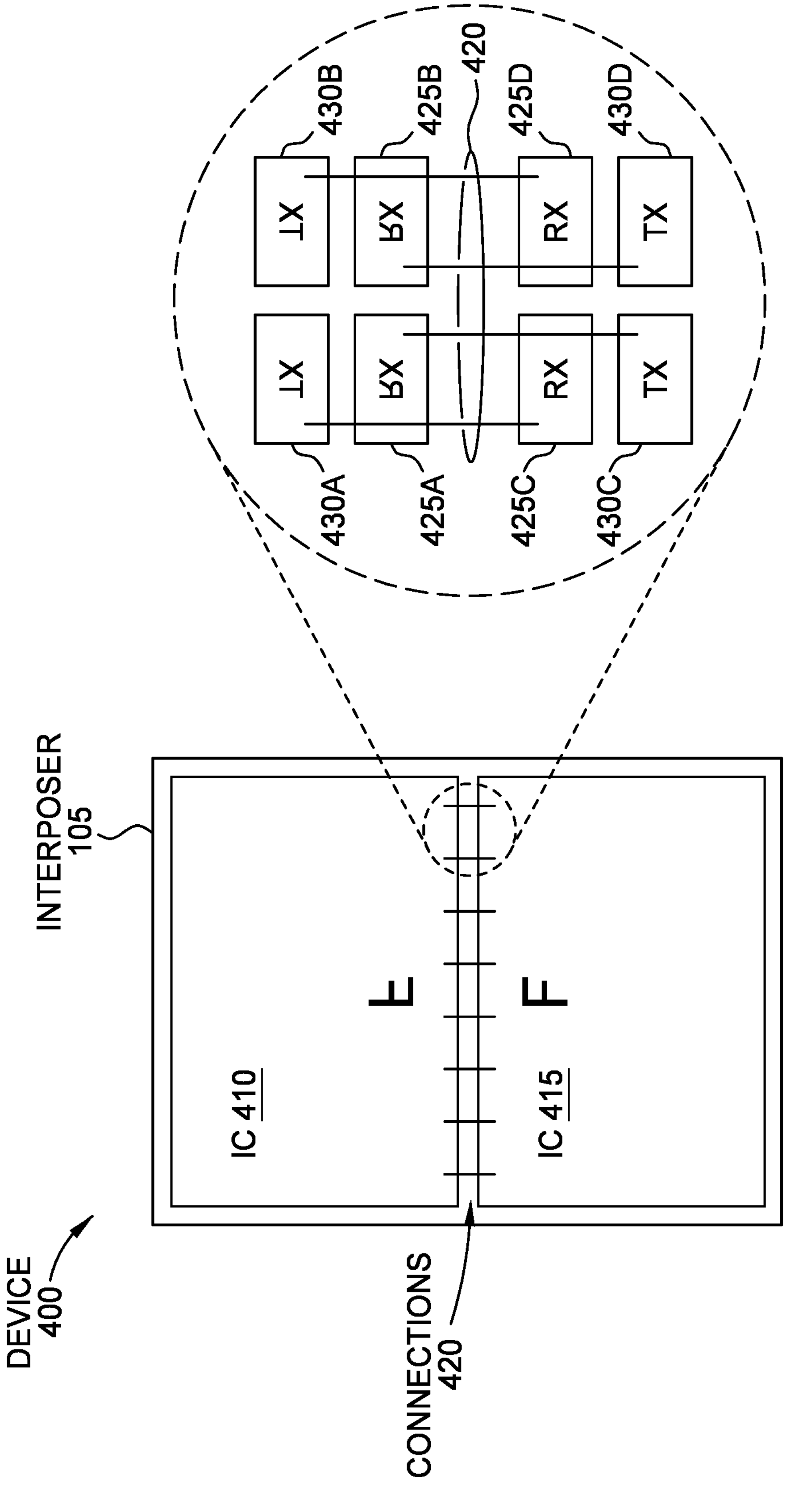
FIG. 4 illustrates chip-to-chip connections for a device with mirrored ICs that have aligned TX and RX circuitry, according to an example.
Figure 5:
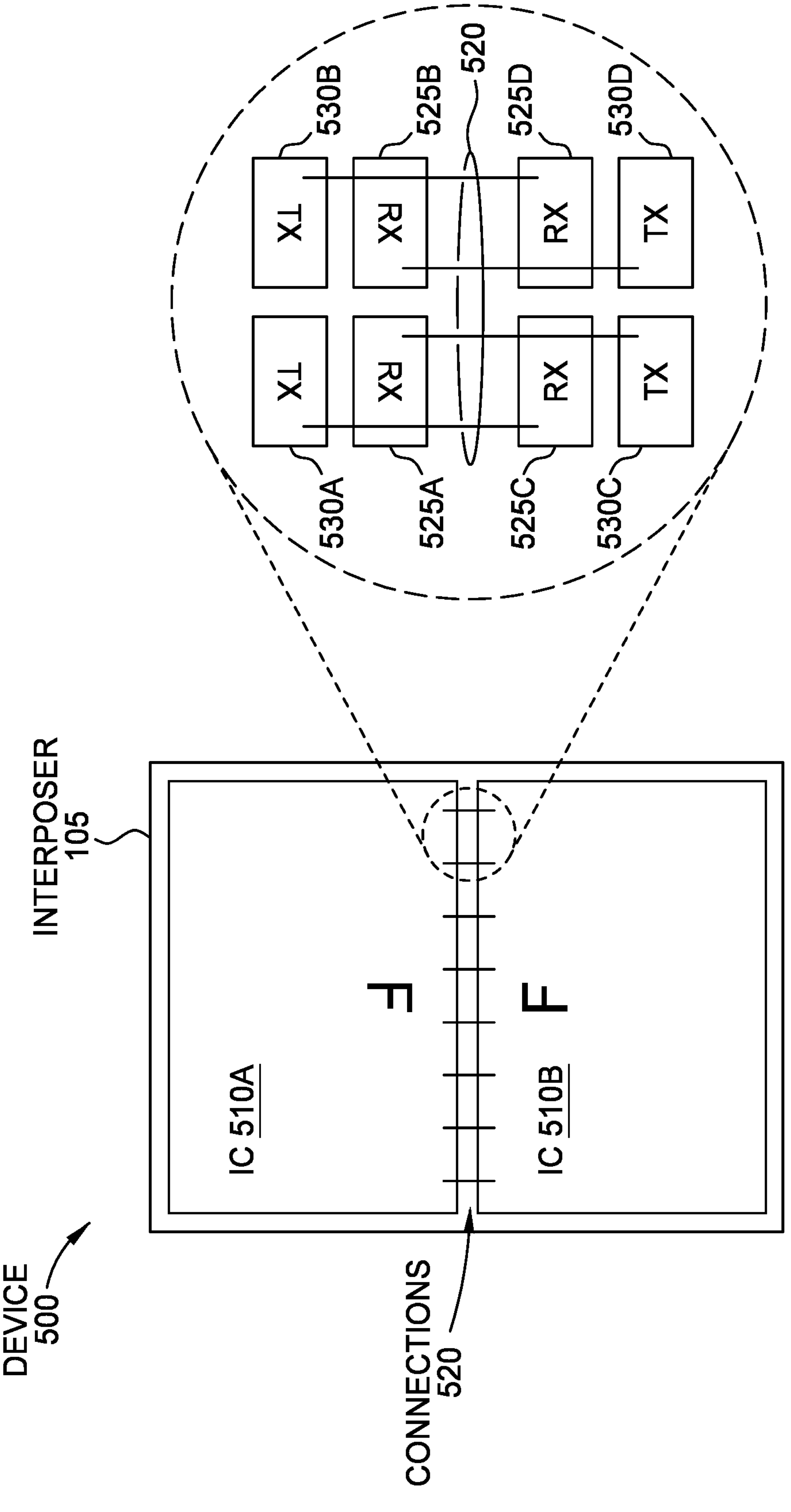
FIG. 5 illustrates chip-to-chip connections for a device with rotated ICs that have aligned TX and RX circuitry, according to an example.

FIG. 4 illustrates chip-to-chip connections for a device 400 with mirrored ICs that have aligned TX and RX circuitry, according to an example. That is, the device 400 includes the interposer 105 on which the ICs 410 and 415 are disposed. In this example, the IC 410 is a mirror of the IC 415. Stated differently, the circuit layout of the IC 415 is mirrored relative to the circuit layout of the IC 410. This is illustrated by the "F" character where the F for the IC 410 is a mirror of the F in the IC 415. As already discussed above, mirror a circuit layout may be a much easier design process than designing two different ICs designs, like the ICs 110 and 115 in FIG. 1.

Unlike in FIG. 2 where disposing two mirrored ICs side-by-side results in misaligning the TX and RX circuitry, the blowout in FIG. 4 illustrates that the mirrored TX and RX circuitry in the ICs 410 and 415 is aligned. In this example, the RX PHYs 425A and 425B and the TX PHYs 430A and 430B are in the IC 410 while the RX PHYs 425C and 425D and the TX PHYs 430C and 430C are in the IC 415. Further, FIG. 4 illustrates mirrored text "TX" and "RX" for the TX PHYs 430A and 430B and the RX PHYs 425A and 4258 relative to the TX PHYs 430C and 430D and the RX PHYs 425C and 425D in the IC 415. This further illustrates the mirrored chip layouts of the IC 410 and IC 415.

Notably, instead of lining up the RX and TX PHYs in columns in FIG. 2, the RX and TX PHYs are arranged in rows in the ICs 410 and 415 in FIG. 4. As such, when the circuit layout is mirrored, at least one RX PHY 425 in one of the ICs aligns with a TX PHY 430 in the other IC. As such, arranging the RX and TX PHYs in rows at a periphery of the ICs 410, 415 results in the RX and TX PHYs being aligned when the ICs are disposed side by side in the device 400. Put differently, the RX PHYs are arranged in a first row parallel with the periphery of the IC and the TX PHYs are arranged in a second, different row parallel with the periphery of the IC. While FIG. 4 illustrates the row containing the RX PHYs 425 being closer the periphery of the ICs 410 and the 415 that the row containing the TX PHYS 430, this could be reversed so that the row containing the TX PHYs 430 is closer to the periphery.

FIG. 5 illustrates chip-to-chip connections for a device 500 with rotated ICs that have aligned TX and RX circuitry, according to an example. That is, the device 500 includes the interposer 105 on which the ICs 510A and 510B are disposed. In this example, the IC 510A has the same circuitry layout or circuitry design of the IC 510B, but has been rotated 180 degrees when disposed on the interposer 105. Stated differently, the ICs 510 may be formed using the same tapeout or same set of masks. As such, the ICs 510 may be the exact same, but one chip is rotated 180 degrees relative to the other. This is illustrated by the "F" character where the F for the IC 510A is rotated 180 degrees relative to the F in the IC 510B.

The blowout in FIG. 5 illustrates that using the same ICs, which are rotated, means that the TX and RX circuitry in the ICs 510A and 510B are aligned. In this example, the RX PHYs 525A and 525B and the TX PHYs 530A and 530B are in the IC 510A while the RX PHYs 525C and 525D and the TX PHYs 530C and 530C are in the IC 510B. Further, FIG. 5 illustrates rotated text "TX" and "RX" for the TX PHYs 530A and 530B and the RX PHYs 525A and 525B relative to the TX PHYs 530C and 530D and the RX PHYs 525C and 525D in the IC 510B. That is, the text "TX" and "RX" has been rotated 180 degrees in the IC 510A relative to this text in IC 510B.

The chip-to-chip connections 520 through the interposer 105 connect the RX PHYs 525A and 525B in the IC 510A to corresponding TX PHYs 530C and 530C in the IC 510B and connect the RX PHYs 525C and 525D in the IC 510B to corresponding TX PHYs 530A and 530C in the IC 510A. As shown, the connections 520 are non-crossing in the interposer 105, which provides the advantages discussed above. This means the connections 520 do not have to be routed using multiple layers in the interposer 105. Thus, like in FIG. 3, the arrangement of the RX PHYs 525 and the TX PHYs 530 in FIG. 5 provides for aligned circuitry when using the same, but rotated ICs. Put differently, when the RX PHYs 525 and the TX PHYs 530 are arranged in rows at the periphery of the ICs 510, they are still aligned when the IC 510A is rotated 180 degrees relative to the IC 510B, just like the column arrangement of the TX and RX PHYs illustrated in the IC 310 in FIG. 3. As such, FIGS. 4 and 5 illustrate that arranging the RX PHYs and the TX PHYs in rows at a periphery of the IC results in aligned TX and RX circuitry (e.g., non-crossing chip-to-chip connections in the interposer 105) for both mirrored ICs and rotated ICs.

However, while the TX and RX circuitry are aligned when the ICs 510 are rotated relative to each, the bits transmitted between the RX PHYs 525 and the TX PHYs 530 may be out of order. This is because, when rotated, the RX and TX PHYs in the IC 510A will be aligned with different RX and TX PHYs in the IC 510B. That is, unlike in the mirrored IC embodiment in FIG. 4, the RX and TX PHYs in the IC 510A align with different RX and TX PHYs in the IC 510B which can result in the bits transmitted by the TX PHYs and received by the RX PHYs being in the incorrect order.

However, bit mis-ordering occurs (for other reasons) in chip-to-chip interfaces. There are a variety of different bit re-ordering techniques that can be used to reorder the bits after they are received by the RX PHYs 525. That is, the bits can be reordered by hardware or software elements in the receiving IC before the data is then processed by other circuitry in the receiving IC.

While FIGS. 4 and 5 illustrates a 1×2 arrangement (e.g., one column, and two rows of ICs), in other embodiments, the device may have a 1×3 or 1×4 arrangement. In that case, some of the ICs may have chip-to-connections with two ICs (e.g., using an upper and lower side).

In one embodiment, the ICs in FIGS. 4 and 5 can be ASICs, FPGAs, SoCs, etc. For example, with FPGAs, typically two different tapeouts are used to connect two FPGAs with different circuit designs or circuit layouts onto the same interposer. Thus, being able to use a mirror of the circuit layout to attach two FPGAs, or rotate two FPGAs with the same circuit layout as described herein can be especially advantageous since it reduces the complexity for generating the masks sets for two tapeouts, or enables the use of only one tapeout.

Figure 6:
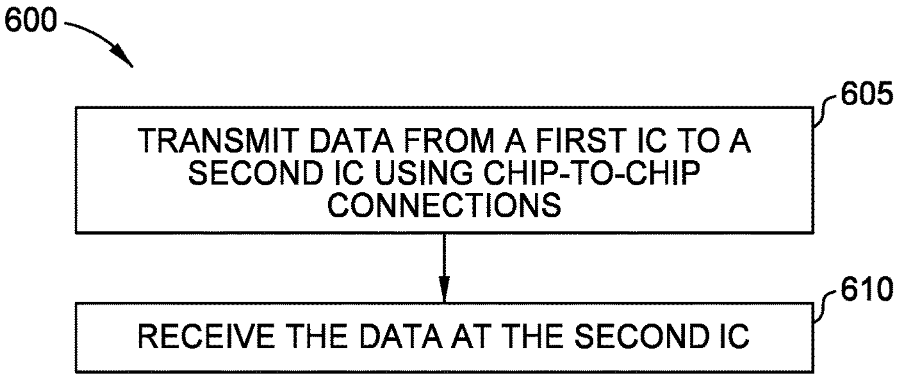
FIG. 6 is a flowchart for using operating a multiple-chip device, according to an example.

FIG. 6 is a flowchart of a method 600 for using operating a multiple-chip device, according to an example. At block 605, a first IC transmits data to a second IC using chip-to-chip connections in an interposer where the first and second ICs are disposed on the interposer. Further, the TX and RX PHYs on the first and second ICs may be arranged as shown in FIGS. 4 and 5 where the first IC includes a first row of TX PHYs parallel to a periphery of the first IC and a second row of RX PHYs parallel to the periphery of the first IC and the second IC includes a third row of TX PHYs parallel to a periphery of the second IC and a fourth row of RX PHYs parallel to the periphery of the second IC. Moreover, the chip-to-chip connections couple respective ones of the RX PHYs in the first IC to the TX PHYs in the second IC and respective ones of the RX PHYs in the second IC to the TX PHYs in the first IC.

At block 610, the second IC receives the data from the first IC using the chip-to-chip connections in the interposer. Moreover, in parallel or at different times, the second IC can transmit data to the first IC using the chip-to-chip connections.

Figure 7:
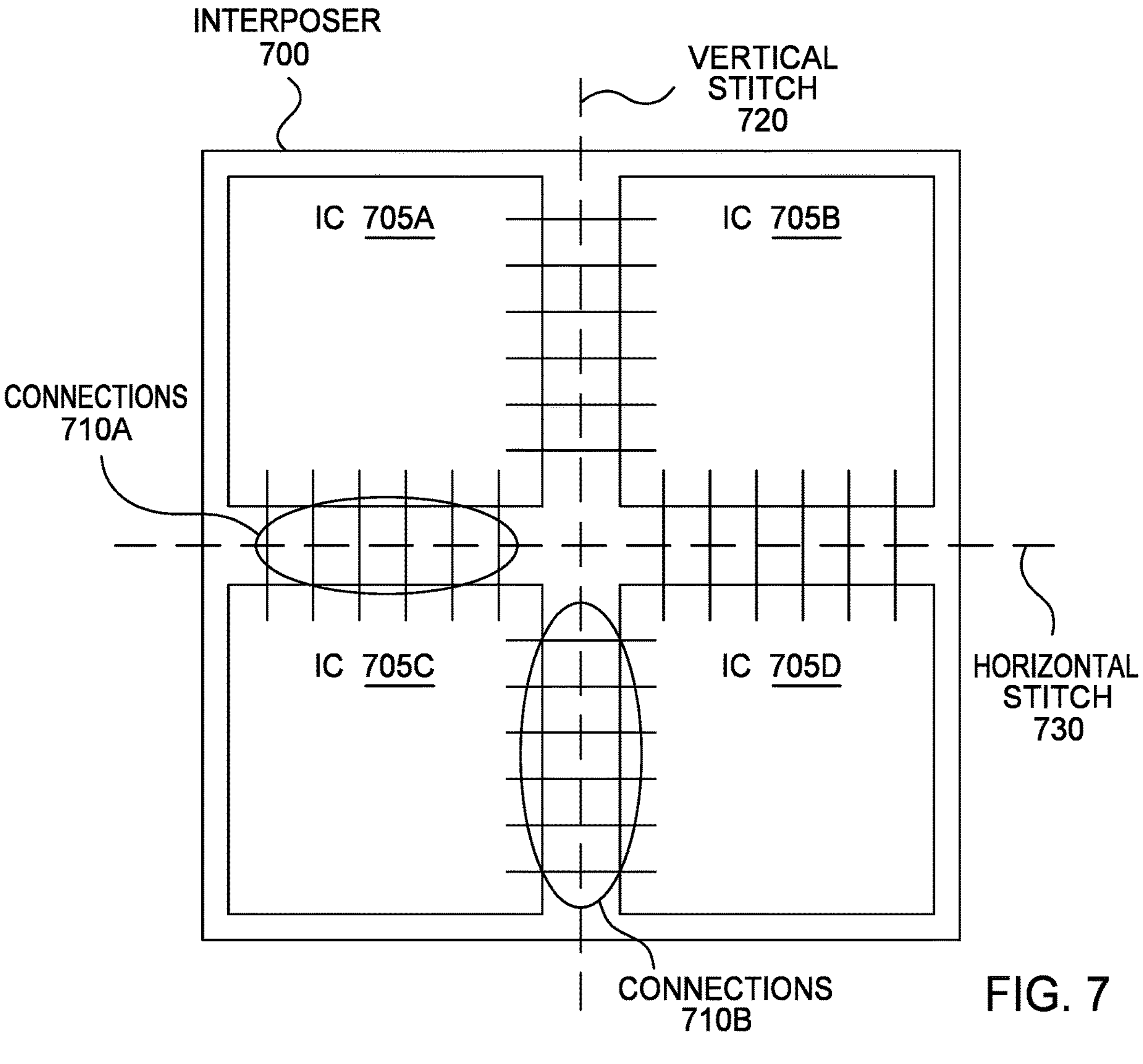
FIG. 7 illustrates a 2×2 configuration of ICs on an interposer, according to an example.

FIG. 7 illustrates a 2×2 configuration of ICs 705 on an interposer 700, according to an example. In this top view, the ICs 705 are disposed in respective corners of the interposer

700. The interposer 700 provides connections between neighboring ICs 705. For example, the interposer 700 can be a silicon interposer that includes one or more layers that include traces for forming the connections 710. In one embodiment, the ICs 705 may be mounted onto the interposer using solder balls, which then electrically couple the ICs 705 to the connections 710 that route electrical signals from one IC 705 to a neighboring IC 705.

Unlike 1×2, 1×3, or 1×4 arrangements where at least some of the ICs only use one side to communicate with a neighboring IC, in the 2×2 configuration shown in FIG. 7, each IC 705 uses two sides to communicate with the two neighboring ICs. For example, IC 705C uses the horizontal connections 710B to communicate with IC 705D and the vertical connections 710A to communicate with the IC 705A. Thus, the 2×2 configuration effectively doubles the amount of chip-to-chip connections that each IC can be have relative to some of the ICs in the 1×2, 1×3, or 1×4 arrangements which communicate using only one side.

The ICs 705 in FIG. 7 can use the arrangement of the TX and RX PHYs illustrated in FIGS. 4 and 5 where the TX and RX PHYs are disposed on rows at the periphery of the ICs 705. That way, regardless whether the ICs 705 are mirrored or rotated, the TX and RX PHYs can align to form non-crossing connections 710 in the interposer 105.

In this embodiment, the interposer 700 has a surface area that exceeds a reticle limit of the fabrication techniques used to fabricate the interposer. The size of an IC 705 is limited by the reticle limit which defines the amount of area that can be exposed and processed using masks. Currently, for a monolithic die, the maximum size is limited to 33-26 mm which is the reticle limit. Thus, the widths and heights of the ICs 705 are limited to this reticle limit.

In order for the interposer 700 to support multiple ICs 705 which have sizes that are at or just below the reticle limit, it has to have a surface area that exceeds the reticle limit. This means that interposer 700 cannot be fabricated using a single exposure process. Instead, the interposer 700 includes a vertical stitch 720 and a horizontal stitch 730 where multiple exposure areas slightly overlap. This permits the interposer to still have traces to form the connections 710 and have sufficient surface area to support the 2×2 configuration of the ICs 705.

In one embodiment, the interposer 700 has a total surface area that is three times the size of the reticle limit (e.g., the maximum reticle field). Moreover, unlike interposers that support 1×2, 1×3, and 1×4 configurations that may only have horizontal stitches, the interposer 700 has both a horizontal stitch 730 and a vertical stitch 720.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A device, comprising:

an interposer;

a first IC disposed on the interposer, the first IC comprising a first row of transmit physical layers (TX PHYs) parallel to a periphery of the first IC and a second row of receive physical layers (RX PHYs) parallel to the periphery of the first IC, the first and second rows disposed at different distances from the periphery of the first IC;

a second IC disposed on the interposer, the second IC comprising a third row of TX PHYs parallel to a periphery of the second IC and a fourth row of RX PHYs parallel to the periphery of the second IC, the third and fourth rows disposed at different distances from the periphery of the second IC; and chip-to-chip connections, in the interposer, coupling respective ones of the RX PHYs in the first IC to the TX PHYs in the second IC and respective ones of the RX PHYs in the second IC to the TX PHYs in the first IC.

2. The device of claim 1, wherein the chip-to-chip connections are non-crossing.

3. The device of claim 2, wherein each of the TX PHYs in the first IC is aligned in a same column as one of the RX PHYs in the second IC and each of the TX PHYs in the first IC is aligned in a same column as one of the RX PHYs in the first IC.

4. The device of claim 1, wherein the first IC has a circuit layout that mirrors a circuit layout of the second IC.

5. The device of claim 4, wherein bit re-ordering is not performed by the first IC and second IC on bits received by the chip-to-chip connections.

6. The device of claim 1, wherein the first IC has a circuit layout that is the same as a circuit layout of the second IC, wherein the circuit layout of the first IC is rotated 180 degrees relative to the circuit layout of the second IC.

7. The device of claim 6, wherein the first IC and second IC are configured to perform bit re-ordering on bits received by the chip-to-chip connections.

8. The device of claim 1, further comprising:

a third IC disposed on the interposer, the third IC comprising a fifth row of TX PHYs parallel to a periphery of the third IC and a sixth row of RX PHYs parallel to the periphery of the third IC, wherein the chip-to-chip connections couple respective ones of the RX PHYs in the third IC to the TX PHYs in the first IC and respective ones of the RX PHYs in the first IC to the TX PHYs in the third IC.

9. The device of claim 8, further comprising:

a fourth IC disposed on the interposer, the fourth IC comprising a seventh row of TX PHYs parallel to a periphery of the fourth IC and an eight row of RX PHYs parallel to the periphery of the fourth IC, wherein the first, second, third, and fourth ICs are disposed in a 2×2 configuration, wherein the chip-to-chip connections couple respective ones of the RX PHYs in the fourth IC to the TX PHYs in the second IC and respective ones of the RX PHYs in the second IC to the TX PHYs in the fourth IC, and wherein the chip-to-chip connections couple respective ones of the RX PHYs in the fourth IC to the TX PHYs in the third IC and respective ones of the RX PHYs in the third IC to the TX PHYs in the fourth IC.

10. A method, comprising:

transmitting data from a first IC to a second IC using chip-to-chip connections in an interposer, wherein the first and second ICs are disposed on the interposer; and receiving the data at the second IC, wherein the first IC comprises a first row of transmit physical layers (TX PHYs) parallel to a periphery of the first IC and a second row of receive physical layers (RX PHYs) parallel to the periphery of the first IC, the first and second rows disposed at different distances from the periphery of the first IC, and wherein the second IC comprises a third row of TX PHYs parallel to a periphery of the second IC and a fourth row of RX PHYs parallel to the periphery of the second IC, the third and fourth rows disposed at different distances from the periphery of the second IC, and wherein the chip-to-chip connections couple respective ones of the RX PHYs in the first IC to the TX PHYs in the second IC and respective ones of the RX PHYs in the second IC to the TX PHYs in the first IC.

11. The method of claim 10, wherein the chip-to-chip connections are non-crossing.

12. The method of claim 10, wherein each of the TX PHYs in the first IC is aligned in a same column as one of the RX PHYs in the second IC and each of the TX PHYs in the first IC is aligned in a same column as one of the RX PHYs in the first IC.

13. The method of claim 10, wherein the first IC has a circuit layout that mirrors a circuit layout of the second IC.

14. The method of claim 13, wherein bit re-ordering is not performed by the first IC and second IC on bits received by the chip-to-chip connections.

15. The method of claim 10, wherein the first IC has a circuit layout that is the same as a circuit layout of the second IC, wherein the circuit layout of the first IC is rotated 180 degrees relative to the circuit layout of the second IC.

16. The method of claim 15, further comprising:

performing bit re-ordering on the data received by second IC.

17. The method of claim 10, further comprising:

transmitting data from the first IC to a third IC disposed on the interposer, wherein the third IC comprises a fifth row of TX PHYs parallel to a periphery of the third IC and a sixth row of RX PHYs parallel to the periphery of the third IC, wherein the chip-to-chip connections couple respective ones of the RX PHYs in the third IC to the TX PHYs in the first IC and respective ones of the RX PHYs in the first IC to the TX PHYs in the third IC.

18. A device, comprising:

an interposer;

a first FPGA disposed on the interposer, the first FPGA comprising a first circuit design, the first circuit design comprising a first row of transmit physical layers (TX PHYs) parallel to a periphery of the first FPGA and a second row of receive physical layers (RX PHYs) parallel to the periphery of the first FPGA, the first and second rows disposed at different distances from the periphery of the first FPGA; and a second FPGA disposed on the interposer, the second FPGA comprising a second circuit design that is a mirror of the first circuit design, the second circuit design comprising a third row of TX PHYs parallel to a periphery of the second FPGA and a fourth row of RX PHYs parallel to the periphery of the second FPGA, the third and fourth rows disposed at different distances from the periphery of the second FPGA, wherein the interposer provides connections between the first and second FPGAs that are non-crossing.

19. A device, comprising:

an interposer;

a first FPGA disposed on the interposer, the first FPGA comprising a first circuit design, the first circuit design comprising a first row of transmit physical layers (TX PHYs) parallel to a periphery of the first FPGA and a second row of receive physical layers (RX PHYs) parallel to the periphery of the first FPGA, the first and second rows disposed at different distances from the periphery of the first FPGA; and a second FPGA disposed on the interposer, the second FPGA comprising the first circuit design, wherein the second FPGA is rotated relative to the first FPGA, wherein the interposer provides connections between the first and second FPGAs that are non-crossing.

* * * * *